July 8, 1924.
H. L. SMITH
VEHICLE BUMPER
Filed Oct. 2, 1920
1,500,650
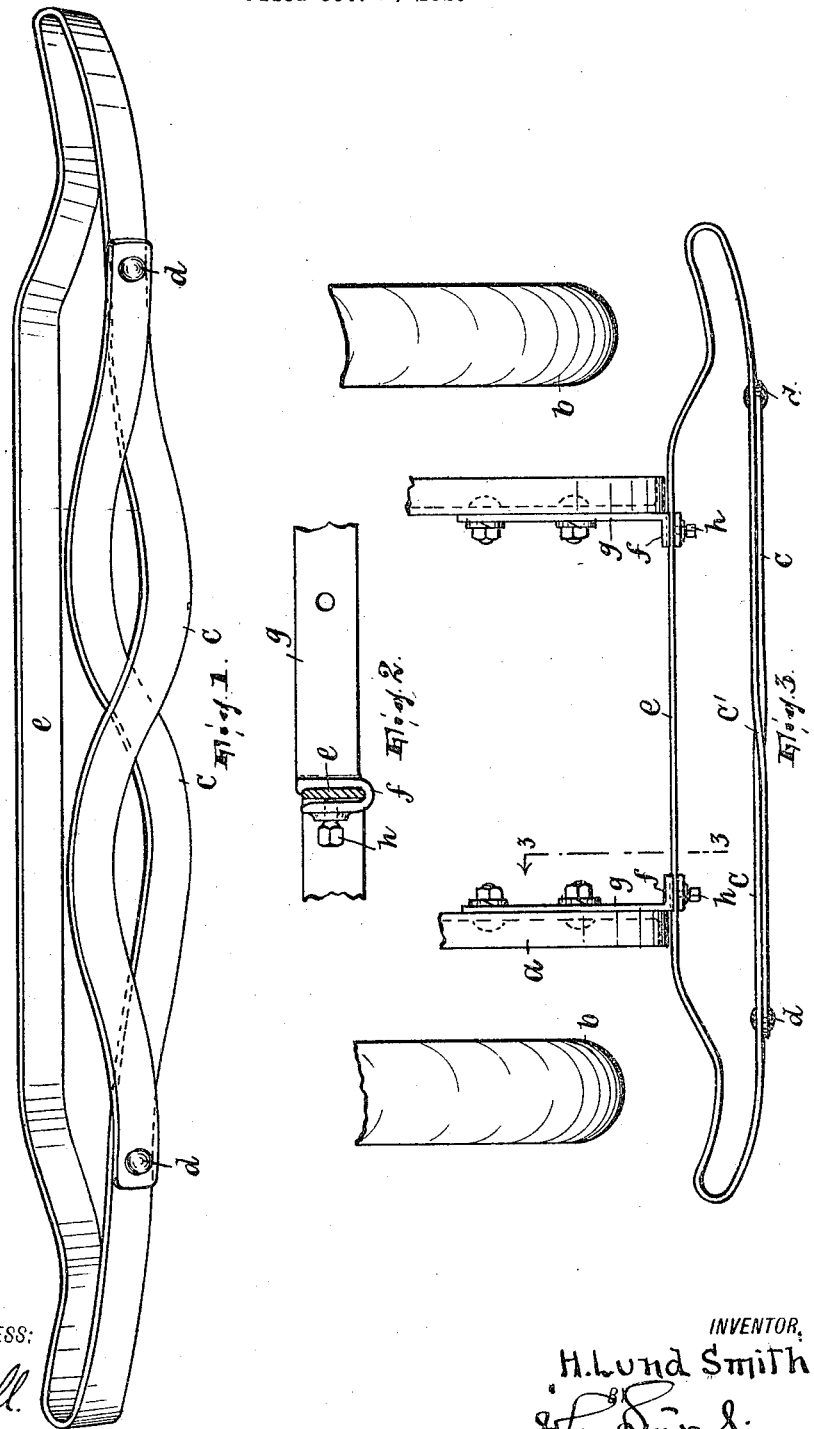

Patented July 8, 1924.

1,500,650

UNITED STATES PATENT OFFICE.

HENRY LUND SMITH, OF PATERSON, NEW JERSEY.

VEHICLE BUMPER.

Application filed October 2, 1920. Serial No. 414,284.

*To all whom it may concern:*

Be it known that I, HENRY LUND SMITH, a citizen of the United States, residing at Paterson, in the county of Passaic and State of New Jersey, have invented certain new and useful Improvements in Vehicle Bumpers, of which the following is a specification.

This invention relates to vehicle bumpers, intended especially for automobiles, of the class including a more or less elastic structure arranged to project across the vehicle at front or rear, and its principal object is to provide a bumper of this class which shall be so constructed as to prevent the forward bumper on one vehicle from overreaching or underreaching the rear bumper on another vehicle and so interlocking the vehicles and which shall be strong and durable in construction, simple and inexpensive to manufacture and pleasing in appearance.

In the accompanying drawing, Figure 1 is a front perspective view of the improved bumper, without its supporting devices;

Figure 2 is a plan of the front portion of a vehicle and of the improved bumper attached thereto; and Figure 3 is a sectional view on line 3—3, Figure 2.

The vehicle frame is indicated at $a$ and its wheels at $b$.

The principal feature of the improved bumper is a pair of coacting elongated impact members projecting in opposite directions and each having reverse bends formed up and down therein, each member intersecting the other between two adjoining bends thereof.

These members are in the drawing the sinuous members $c\ c$, each in the example illustrated having only two bends formed up and down, one reverse to the other, and each member crossing the other, as shown, between the bends thereof.

In the preferred construction, to promote symmetry and increased strength, I cross the members not only as seen from front or rear but as viewed in plan (see at $c'$ in Figure 2) and then arrange the end of each member so that as between it and a part of the other member one will have rearward support on the other—in example illustrated the end of each member has rearward support on a part of the other member.

The members are preferably, also, secured together, as indicated at $d$, where rivets are shown binding the members together.

It is not material in the broad aspect of my invention how a bumper including coacting members constructed sustantially in accordance with my invention is supported on the vehicle. In the example illustrated the members $c\ c$ are shown as the forwardly rebent extensions of a cross-piece $e$ (more particularly, in the illustrated example not only is the cross-piece single or integral but the entire structure $c\ e\ c$, being a strip whose end portions $c\ c$, formed with reverse up and down bends, are fowardly rebent) which is received in the forward clips $f$ of hangers or brackets $g$ which are bolted or otherwise secured to some part of the vehicle, as the frame $a$, the clips having set-screws $h$ to hold said cross-piece in place.

It will be understood that suitable somewhat elastic strip material is preferably used, as shown, to form the parts $c\ e\ c$.

It will be apparent that on account of the up and down bending of the parts $c\ c$ the bumper is prevented from overreaching or underreaching and so interlocking with a bumper on another vehicle.

Having thus fully described my invention, what I claim as new and desire to secure by Letters Patent is:—

1. A vehicle bumper including a pair of coacting elongated impact members projecting in opposite directions and each having reverse bends formed up and down and each member intersecting the other between two adjoining bends thereof.

2. A vehicle bumper including a pair of coacting elongated impact members projecting in opposite directions and each having reverse bends formed up and down and each member intersecting the other between two adjoining bends thereof, the end of each member and a part of the other member having the one a rearward support on the other.

3. A vehicle bumper including a pair of coacting elongated impact members projecting in opposite directions and each having reverse bends formed up and down and each member intersecting the other between two adjoining bends thereof, the end of each member having a rearward support on the other.

4. A bumper comprising an impact member of resilient metal bars shaped to provide a plurality of impact surfaces, of increased area, said surfaces consisting of oppositely off-set portions of each of said bars.

5. A bumper comprising an impact member consisting of a plurality of resilient bars of waved conformation, said bars being clamped together to form a series of loops.

6. A bumper comprising an impact member consisting of resilient bars having waved portions offset in opposite directions from the horizontal plane of the bumper, said bars overlapping each other beyond and between the offset portions, and clamping members applied at the points of overlapping.

In testimony whereof I affix my signature.

HENRY LUND SMITH.